(12) United States Patent
Gordon et al.

(10) Patent No.: US 7,508,393 B2
(45) Date of Patent: Mar. 24, 2009

(54) THREE DIMENSIONAL ANIMATED FIGURES

(76) Inventors: Patricia L. Gordon, 3318 Kerry Rd., Baltimore, MD (US) 21207; Robert E Glaser, 3213 Patmor Rd., Owings Mills, MD (US) 21117

( * ) Notice: Subject to any disclaimer, the term of this patent is extended or adjusted under 35 U.S.C. 154(b) by 513 days.

(21) Appl. No.: 11/447,416

(22) Filed: Jun. 6, 2006

(65) Prior Publication Data

US 2006/0274069 A1 Dec. 7, 2006

Related U.S. Application Data (60) Provisional application No. 60/688,064, filed on Jun. 7, 2005.

(51) Int. Cl.
*G06T 15/70* (2006.01)

(52) U.S. Cl. .................. 345/473; 345/474; 345/952; 40/416; 40/457; 40/463; 446/175; 446/180; 446/342; 704/254; 704/275

(58) Field of Classification Search ............... 345/473, 345/474, 592; 40/416, 457, 463; 446/175, 446/180, 342; 704/254, 275
See application file for complete search history.

(56) References Cited

U.S. PATENT DOCUMENTS

| | | |
|---|---|---|
| 4,177,589 A | 12/1979 | Villa |
| 4,808,142 A | 2/1989 | Berliner |
| 4,900,289 A | 2/1990 | May et al. |
| 5,074,821 A | 12/1991 | McKeefery et al. |
| 5,108,341 A | 4/1992 | DeSmet |
| 5,413,516 A | 5/1995 | Lam |
| 5,607,336 A | 3/1997 | Lebensfeld et al. |
| 5,823,847 A | 10/1998 | Gellman |
| 6,054,999 A * | 4/2000 | Strandberg ................ 345/474 |
| 6,121,953 A * | 9/2000 | Walker ..................... 345/156 |
| 6,285,380 B1 * | 9/2001 | Perlin et al. ............... 345/473 |
| 6,369,821 B2 * | 4/2002 | Merrill et al. ............. 345/473 |
| 6,386,942 B1 | 5/2002 | Tang |
| 2001/0053651 A1 | 12/2001 | Wright |
| 2002/0008703 A1 * | 1/2002 | Merrill et al. ............. 345/473 |
| 2002/0158972 A1 * | 10/2002 | Stephany et al. ........... 348/239 |

* cited by examiner

*Primary Examiner*—Kimbinh T Nguyen
(74) *Attorney, Agent, or Firm*—John E. Simms, Jr.

(57) ABSTRACT

A system comprising a plurality of three dimensional artificially animated portraits for performing preprogrammed animations of voice and facial expressions in the form of a scripted dialogue orchestrated by a central source. The system is operable to prepare animations of recorded voice and selected depictions of facial expressions to be transferred to the animated portraits and performed by the animated portraits. The system is operable to combine prepared animations in a scripted dialogue to be performed so as to mimic an interactive conversation.

14 Claims, 10 Drawing Sheets

Delay Parameter #7

( ) Fixed ( ) Seconds
( ) Minutes
( ) Hours
( ) Days (•) Random from [ 10 ]

(•) Seconds
( ) Minutes
( ) Hours
( ) Days to [ 33 ]

(•) Seconds
( ) Minutes
( ) Hours
( ) Days

Figure 8

Next Animation after Animation #7

( ) Fixed

[ ]

( • ) List

[ 5, 7, 9, 22, 23 ]

( ) Random

[ ]

( ) Dialog End

Start Parameter #1

(•) Every Day
( ) Weekday
( ) Weekend
( ) Sunday
( ) Monday
( ) Tuesday
( ) Wednesday
( ) Thursday
( ) Friday
( ) Saturday Time  [12:34]  ( ) AM  (•) PM

[X] Wait for sound to begin

Starting Animation: [7]

Figure 11

THREE DIMENSIONAL ANIMATED FIGURES

REFERENCE TO RELATED APPLICATIONS

Applicant claims the benefit of previously filed provisional application, Ser. No 60/688,064, filed 07 Jun. 2005.

BACKGROUND OF THE INVENTION

The present invention relates to a system of artificially animated portraits and particularly to portraits composed of a plurality of three dimensional figure busts configured to produce voice sounds and movement of facial features, in order to present a scripted dialogue of preprogrammed animations from a central source.

Three dimensional figures and figures having a three-dimensional aspect, have long been used to teach, entertain and amuse. Figures may be formed to resemble humans and animals. They can be adapted or clothed with accessories to suggest a resemblance to members of a particular profession or group. Figures can be made to suggest a resemblance to a specific recognizable individual. Figures, or portions of figures may be configured as puppets to aid in the presentation of a dramatic script.

For purposes of dramatic presentations, puppet figures have been animated using a variety of methods. Simple methods include the marionette and the hand puppet. Dramatic presentations conveyed the illusion that these animated figures moved and gave voice, to perform activities and engage in dialogue. Advances in technology have made it possible to produce more complex and more realistic figures which are capable of animation and voice. The U.S. Pat. No. 4,177,589, to Villa demonstrates the use of miniature electronic and mechanical apparatus together with a flexible covering material, to produce a replica of a human face with concealed equipment for life-like movements of the facial features. It is possible to use a figure or a bust incorporating the features as disclosed in the patent to Villa to produce a dramatic reading having a high degree of realism. It is possible that a plurality of such figures could be grouped together to present a dramatic dialogue.

It would be a further advantage to have a system which could store voice recordings and movement instructions for a plurality of grouped figure busts or full figures and which could control and operate the figures to present animations in synchronized fashion to simulate interactive dialogue.

SUMMARY OF THE INVENTION

The present invention is directed to a system of one or more electronic portraits for presenting preprogrammed animations including facial expression and voice, wherein each of the electronic portraits consists of a grouping of one or more figure busts disposed within a frame. Each of the figure busts is artificially animated and includes a replica of a face. Each of the replicas of a face is provided with one or more moveable facial features, operably connected mechanical means for moving the facial features, and motive means operably connected to the mechanical means, for actuating the mechanical means. Each of the artificially animated figure busts is provided with sound reproducing means and a first data processing means, programmed and configured for receiving and processing a command signal and for receiving, storing, retrieving, and performing preprogrammed animations. Each of the artificially animated figure busts is provided with means for energizing the motive means, the sound reproducing means and the first data processing means.

The system includes a scripting platform and communication channel. The scripting platform includes a second data processing means programmed and configured for preparing, editing, labeling, addressing, storing, and delivering the preprogrammed animations. Each label identifies a particular animation and each address identifies a particular figure bust. The second data processing means is further programmed and configured to prepare, store, and deliver parameters, next animation pointers, animation duration data, and animation lists with addresses, for orchestrating performance of preprogrammed animations by a plurality of figure busts as a scripted dialogue. The scripting platform is electronically linked to each of the artificially animated figure busts, by the communication channel for delivery of the preprogrammed animations, parameters, and animation data. A one of the figure busts is designated as a master figure bust. The master figure bust includes a command package and is electronically linked to all other figure busts by the communication channel. The command package includes command firmware routines programmed on the first data processing means of the master figure bust, a switch, a real time clock, and a microphone. In addition to the animations, the master figure bust receives and stores parameters, next animation pointers, animation duration data, and animation lists with addresses. The command firmware monitors the switch, the real time clock and the microphone to determine an initiation event and executes the command firmware to orchestrate the performance of a scripted dialogue, by performing one or more animations and by issuing one or more command signals to the other figure busts.

It is an object of the present invention to provide a plurality of artificially animated figure busts disposed within one or more frames and positioned to suggest interactive dialogue.

It is an object of the present invention to provide a plurality of artificially animated figure busts capable of receiving, storing, retrieving and performing preprogrammed animations.

It is an object of the present invention to provide a scripting platform for preparing, storing, and delivering animations, consisting of voice and sets of instructions for positioning facial features, to be addressed to a particular artificially animated figure bust.

It is a further object of the present invention to provide a scripting platform for preparing, storing, and delivering parameters and animation duration data for directing the timing, selection, arrangement, and performance of the stored animations, by the artificially animated figure busts.

These and other additional objects, features and advantages of the present invention will become more readily apparent from the attached drawings and the detailed description of the preferred embodiments, which follow.

BRIEF DESCRIPTION OF THE DRAWINGS

The invention will be further understood, by way of example, with reference to the accompanying drawings, in which.

DESCRIPTION OF THE PREFERRED EMBODIMENT

Figure 1:
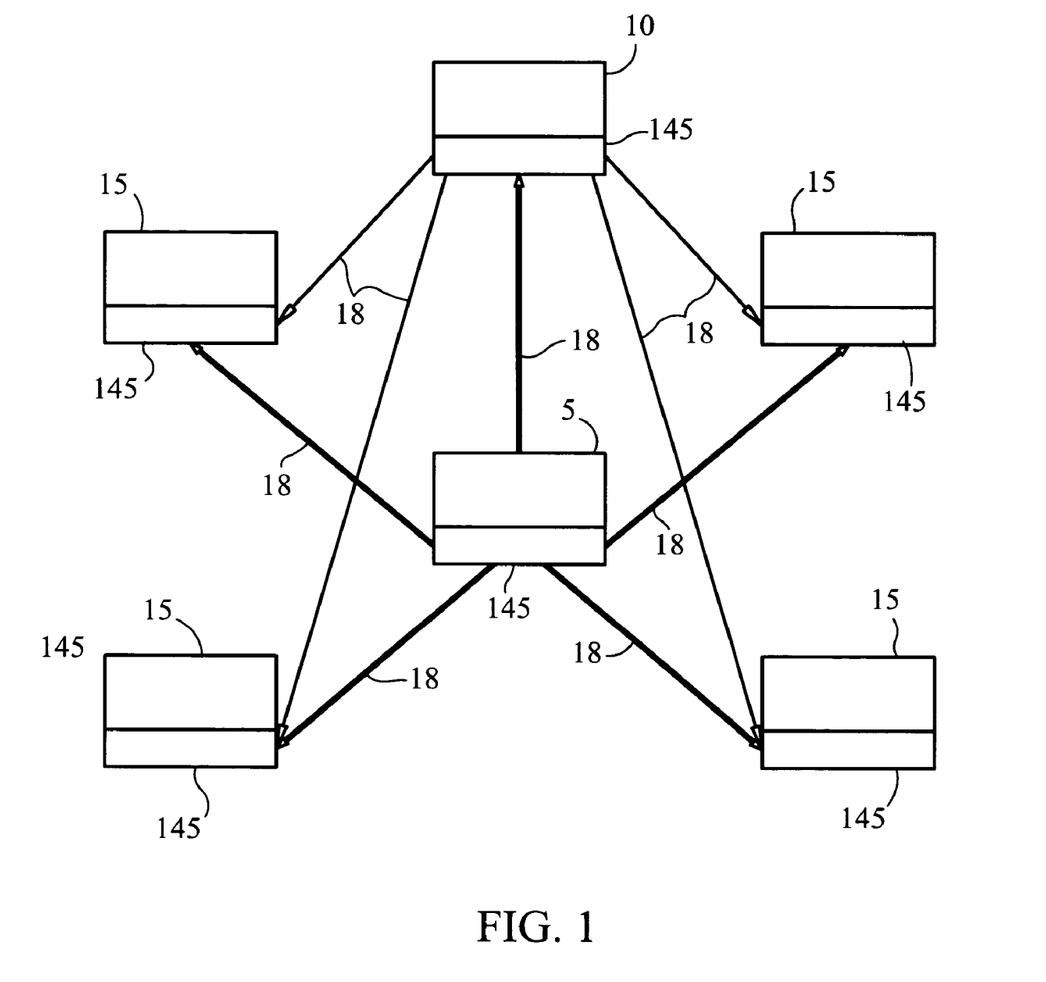
FIG. 1 is a block diagram showing the configuration of the main components of the present invention.
Figure 2A:
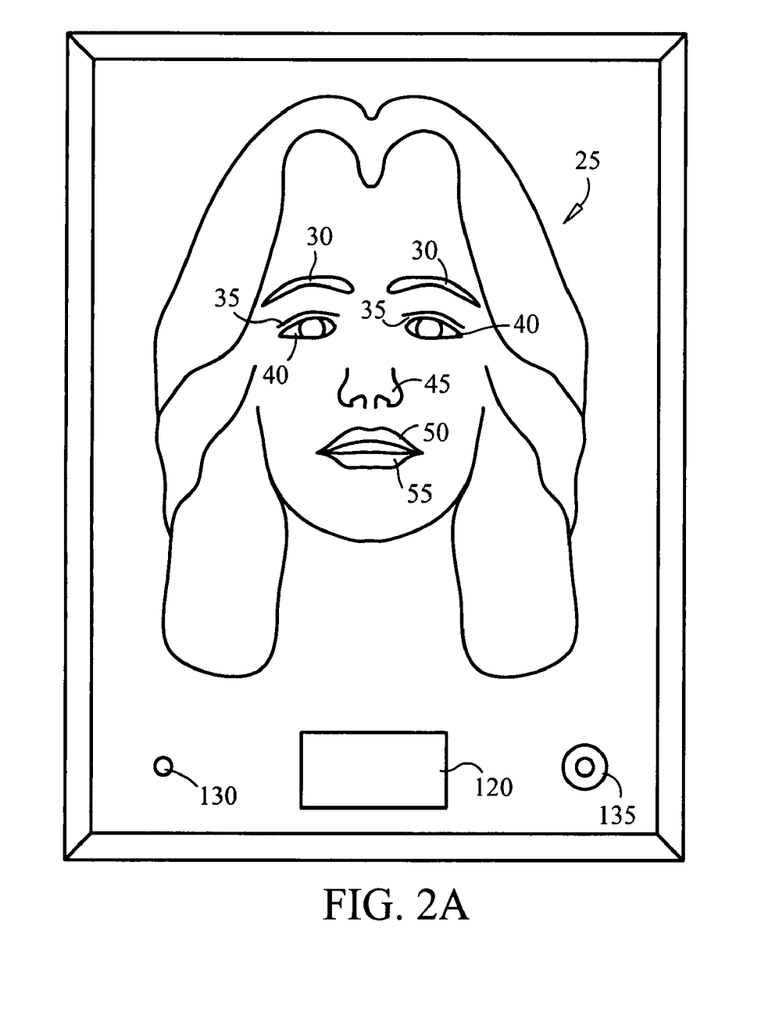
FIG. 2a is a front elevation view of a portrait having a single master figure bust.

The system of electronic portraits, as depicted in the block diagram of FIG. 1, includes a scripting platform 5, an animated master figure bust 10, and a plurality of animated slave figure busts 15. The scripting platform 5, the master figure bust 10, and the slave figure busts 15, are linked by a communication channel 18, as indicated by arrows, in FIG. 1. The master figure bust 10, is similar to the slave figure busts 15, but includes a command package. In the preferred embodiment, the command package is integrated into the master figure bust 10; however, the command package may be configured as a separate unit, in which case the master figure bust 10 would not differ from the slave figure busts 15 and the command package would require additional separate data processing means. The master figure bust 10 and the slave figure busts 15 each comprise a three dimensional replica of a face 25 with one or more moveable facial features. It is intended that the face 25 be mounted for convenient display. In the preferred embodiment, the face 25 is formed in bas relief on a flat panel and mounted in a picture frame, to give the appearance of a portrait with a three dimensional aspect, as shown in FIG. 2a. The face 25 may be formed of molded plastic or other suitable material and has a front surface for display of facial features. It is intended that two dimensional features, such as a neck and shoulders with clothing, are to be added, by painting, attaching fabric cut-outs or other known means to give the appearance of a portrait. In the preferred embodiment, moveable facial features include, the eyebrows 30, eyelids 35, eyeballs 40, nose 45, upper lip 50, and lower lip 55, as shown in FIG. 2a, which are constructed to be mechanically isolated and mounted on the face in a manner which allows movement to simulate various facial expressions. Eyebrows 30 are mounted on a control rod, not shown, which passes through a hole provided in the surface of the face 25. Eyeballs 40 are formed in the shape of a sphere and are mounted in sockets provided in the surface of the face 25, which permit rotation upward, downward, left and right, through ranges of motion defined by the socket. Eyeballs 40 are provided with eyeball control rods 60 fixed at the rear and extending behind the face 25. Eyelids 35 are mounted on a pair of pivot pins at the sides of the socket which allow rotation to selectively cover the front surface of the eyeball 40. The nose 45 is provided with a control rod extending from the rear portion through a slot provided in the surface of the face 25. The upper lip 50 and lower lip 55 are provided with control rods extending rearward through slots provided in the surface of the face 25.

In the preferred embodiment of the present invention, the face 25 may be con structed of flexible material, such as polyvinyl chloride plastic, to make the rendering more realistic. In this version, the facial features may be formed of rig id material, such as plastic or wood, embedded in the flexible material used for construction of the face 25. In this alternate version, the control rods and eyeball control rods 60 would be attached to the rigid parts such that the flexible material would be stretched as the facial features were moved and a more realistic replica of a face 25 would be achieved. When flexible material is used to form the face 25, it is intended that the rigid portion of the nose 45 be positioned near the distal end, so as to simulate movement of a lower area of the nose 45.

Mechanical means are provided for moving the facial features and motive means are provided for actuating the mechanical means. Servos and solenoids are suitable motive means. It is preferred that solenoids be used to provide two position movement of a facial feature and that servos be used to provide multiple position movement of a facial feature. In the preferred embodiment, servos are used to actuate eyelids 35, the nose 45, the eyebrows 30, eyeballs 40, upper lip 50, and lower lip 55. An eyelid servo 65 having an actuating arm, is mounted on the reverse side of the flat panel in close proximity to the control rod for the eyelid. The control rod, for the eyelid, is mechanically linked to the actuating arm. Mechanical means for mechanically linking the control rod, for the eyelid, to the actuating arm of the eyelid servo 65 may be provided by conventional materials, such as rigid members connected by moveable joints. Upon being energized, the eyelid servo 65 will shift the eyelids 35 variably between open and closed position. A single servo may be mechanically linked to both eyelids 35, to provide uniform movement, or as an alternative, separate servos could be linked to each of the eyelids 35 to allow independent movements such as winking. Likewise, a nose servo 70, having an actuating arm is mounted on the reverse side of the flat panel in close proximity to the nose control rod and is connected in like manner. In a similar fashion, the nose servo 70 may be energized to adjust the position of the nose 45 to any point within a range of motion defined by the slot through which the control rod passes.

An eyebrow servo 75, having an actuating arm, is mounted on the reverse side of the flat panel in close proximity to the control rods for the eyebrows 30. The actuating arm of the eyebrow servo 75 is mechanically linked to the control rods of the eyebrows 30, to provide rotation of the control rods of the eyebrows 30, to any position within the range of motion of the eyebrow servo 75.

Figure 3A:
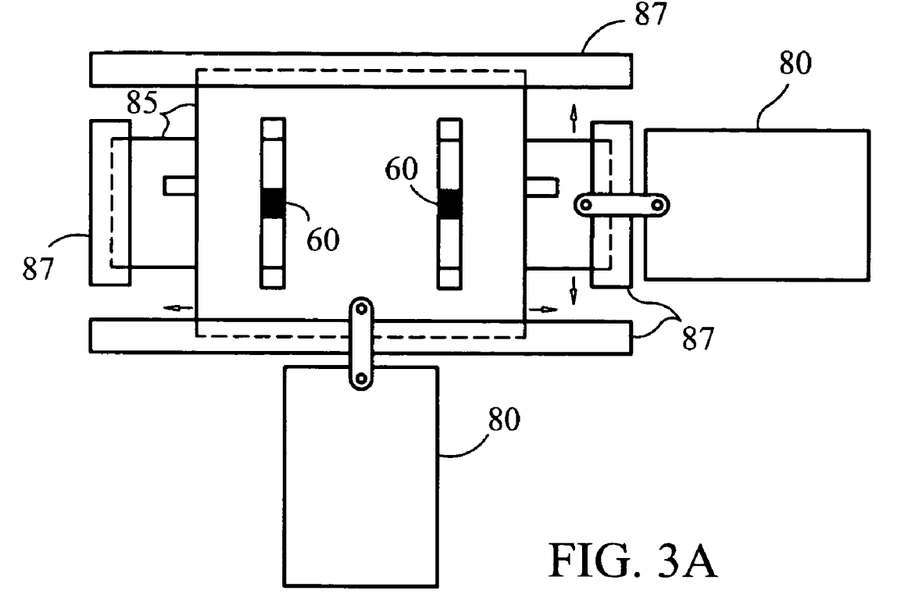
FIG. 3a is a rear plan view of the mechanical means for moving the eyeballs of a figure bust.
Figure 3B:
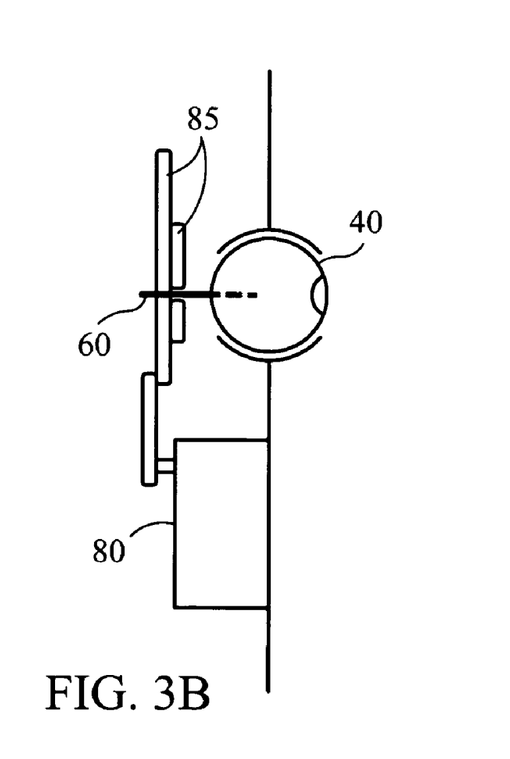
FIG. 3b is a vertical cross-section side view of the mechanical means for moving the eyeballs of a figure bust.

A pair of eyeball servos 80, having actuating arms, are mounted on the reverse side of the flat panel in close proximity to the eyeball control rods 60. Two slotted plates 85 are slideably mounted on the reverse side of the flat panel. The arrangement of a pair of eyeball servos 80 and two slotted plates 85 is shown in FIG. 3a. Each of the slotted plates 85 is configured to allow sliding movement in a direction generally perpendicular to the slots in the plate and each of the slotted plates 85 is retained by guides 87, such that the sliding movement of one is in a direction perpendicular to that of the other. Each of the eyeball control rods 60 engages a slot in each of the slotted plates 85, as shown in FIGS. 3a and 3b. The actuating arm of one of the pair of eyeball servos 80 is mechanically linked to one of the slotted plates 85, such that both eyeballs 40 may be moved in concert with the sliding movement of the one of said slotted plates 85. The actuating arm of the other of the pair of eyeball servos 80 is mechanically linked to the other of the slotted plates 85, in a like manner. Energizing one of the pair of eyeball servos 80 will move both eyeballs 40 left and right to any position in its range of motion. Energizing the other one of the pair of eyeball servos 80 will move both eyeballs 40 up and down to any position in its range of motion. It should be noted that additional servos could be added to provide for independent motion of eyebrows 30 and eyeballs 40. In an alternative version of the present invention, wire loops may be substituted for the slotted plates 85.

An upper lip servo 90 having an actuating arm is mounted on the reverse side of the flat panel in close proximity to the control rod of the upper lip 50. The actuating arm of the upper lip servo 90 is mechanically linked to the control rod of the upper lip 50. The upper lip servo 90 may be energized to move the upper lip 50 to any position within a range of motion defined by the slot through which the control rod of the upper lip 50 passes.

Figure 2B:
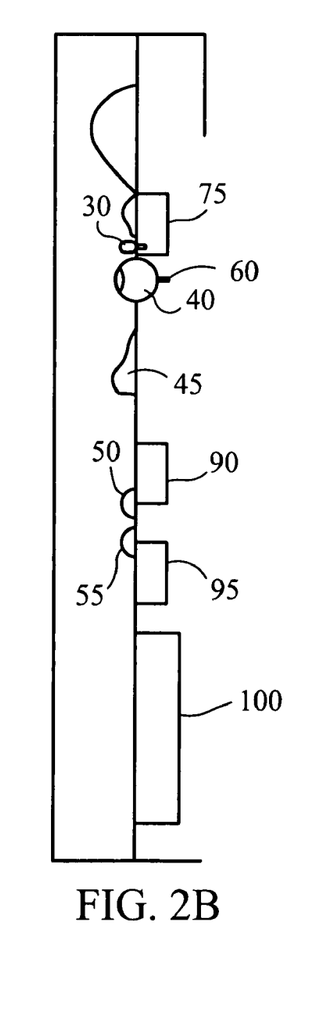
FIG. 2b is a side elevation view of a portrait having a single figure bust.

A lower lip servo 95 having an actuating arm is mounted on the reverse side of the flat panel in close proximity to the control rod of the lower lip 55. The actuating arm of the lower lip servo 95 is mechanically linked to the control rod of the lower lip 55. The lower lip servo 95 may be energized to move the lower lip 55 to any position within a range of motion defined by the slot through which the control rod of the lower lip 55 passes. A cross section of the flat panel showing the position of facial features and actuating means is given in FIG. 2*b*.

Figure 4:
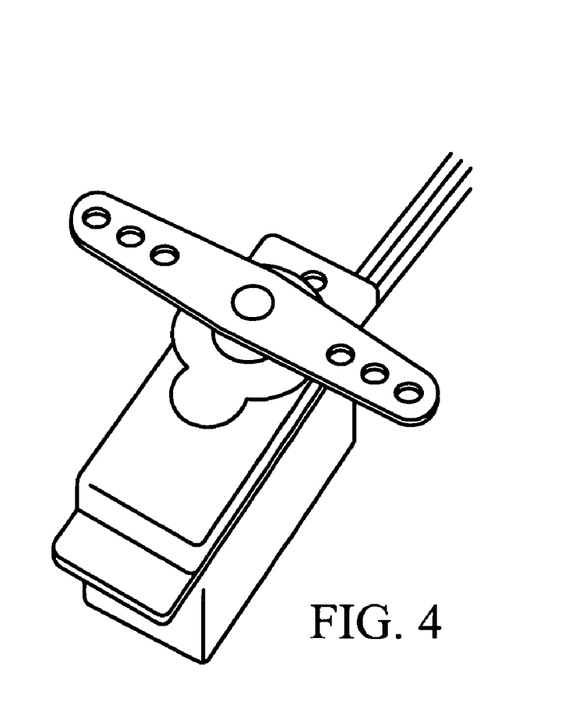
FIG. 4 is a perspective view of a servo mechanism for manipulating a moveable facial feature of a figure bust.

The servo required, for the present invention, is a small device that incorporates a motor, a gear train, a potentiometer, an integrated circuit, and an output shaft bearing. A suitable servo is the HS-55 sub-micro unit from Hitec RCD USA, Inc. of Poway Calif. The servo, with an actuating arm is depicted in FIG. 4. Each servo permits rotation, of the actuating arm from a nominal position to plus or minus ninety degrees and when selectively energized, may place the actuating arm to any position within the range of motion.

The master figure bust 10 and each slave figure bust 15 are provided with a first data processing means, preferably a micro controller 100 and a flash memory 105, which are mounted on the reverse side of the flat panel and electrically connected together, preferably by being integrated onto a circuit board. The flash memory 105 is capable of storing parameters, data, and recorded sound comprising one or more animations. The microcontroller 100 is provided with firmware and is programmed and configured for receiving data, through the communications channel 18, comprising executable sets of instructions and recorded material, storing data on the flash memory 105, retrieving data from the flash memory 105 and executing instructions. The microcontroller 100 is provided with a plurality of pulse width modulation output channels for energizing one or more of the figure bust servos according to the sets of instructions. Each servo is electrically connected to one pulse width modulation channel of the microcontroller 100 according to consistent pattern such that, for each figure bust in the system, the corresponding pulse width modulation channel will be connected to the corresponding servo associated with a corresponding facial feature. A suitable microcontroller 100 is the ATmega 128 from Atmel Corporation, of San Jose, Calif. and a suitable flash memory 105 is the M58LW064D, from STMicroelectronics of Geneva, Switzerland. The microcontroller 100 outputs a signal to a servo on a pulse width modulation channel to selectively energize the servo according to the stored instructions and thereby place the actuating arm in a preprogrammed position within its range of motion. The flash memory 105 provides eight megabytes of nonvolatile rewritable storage.

The master figure bust 10 and each slave figure bust 15 are each provided with a digital to analog converter 110 which is electrically connected to the microcontroller 100, and preferably mounted on the circuit board with the microcontroller 100. The microcontroller 100 is programmed and configured to retrieve audio data from the flash memory 105, according to preprogrammed instructions, and output audio data to the digital to analog converter 110. The master figure bust 10 and each slave figure bust 15 are also provided with an audio amplifier 115 and a speaker 120. The digital to analog converter 110, the audio amplifier 115 and the speaker 120 are electrically connected in conventional manner such that the analog audio output, from the digital to analog converter 110 is delivered to the audio amplifier 115 and output to the speaker 120. A suitable digital to analog converter 110 is the MAX503 from Maxim Integrated Products, Inc. of Sunnyvale, Calif. and a suitable 115 audio amplifier is the MAX4295 from Maxim Integrated Products, Inc. Using eight thousand uncompressed eight-bit samples per second, the flash memory 105 provides over fifteen minutes of recorded audio for each animated figure bust, given that a portion of the memory is to be allocated for instruction data for the microcontroller 100, in addition to the stored audio. It should be noted that the present invention could be adapted, by known means, to make use of compressed audio formats such as MP3, which will permit significantly greater storage capacity for audio data.

Figure 5:
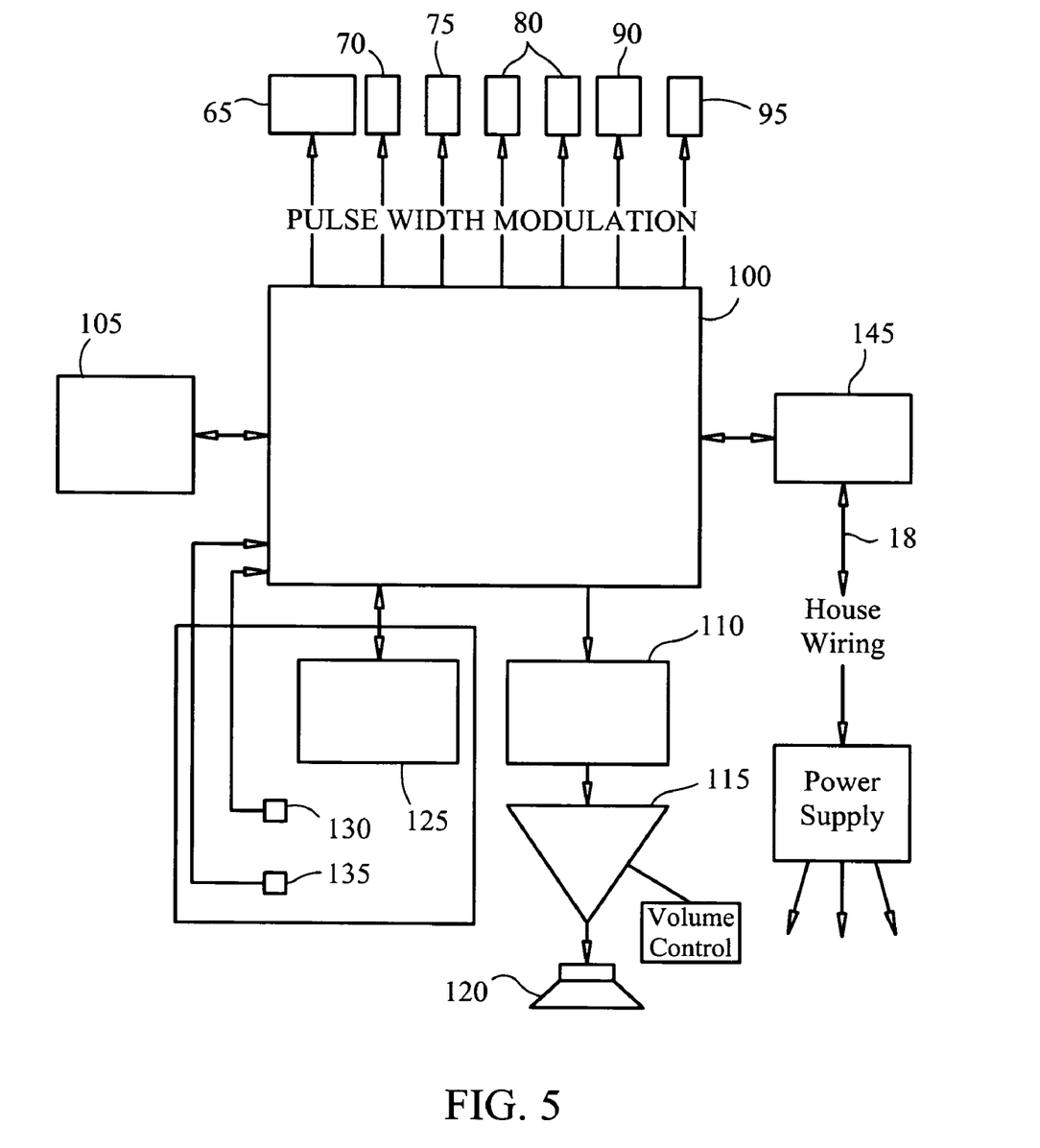
FIG. 5 is a block diagram showing the electrical components of a figure bust.

The command package is preferably integrated with the master figure bust 10, as indicated, by a dotted outline, in FIG. 5, so as to eliminate the need for an additional microcontroller to execute functions of the command package. The command package includes a real time clock 125, a switch 130, such as a pushbutton type, and a microphone 135. The command package also includes command firmware programmed on the microcontroller 100 of the master figure bust 10. The real time clock 125, the switch 130 and the microphone 135, are electrically connected to inputs on the microcontroller 100, of the master figure bust 10, in a conventional manner. The connection is preferably by integrating the components on a circuit board, which is mounted on the flat panel of the master figure bust 10. The microcontroller 100, of the master figure bust 10 is programmed and configured to receive and respond to signals input from each of the real time clock 125, switch 130, and microphone 135. A suitable real time clock 125 is the DS1693 from Maxim Integrated Products, Inc. The microphone 135 and the switch 130 may of conventional manufacture. It is preferable that the real time clock 125 be provided with an internal crystal and a lithium battery to maintain the time setting in the event that power to the system is interrupted for a period of time. It is preferred that the command firmware include one or more pseudorandom number generator routines that are operable for randomly selecting animations and delay parameters.

It is preferred that the components, which are mounted on the flat panel, be enclosed in a box, which may be constructed of rigid sheets formed of cardboard, wood, or plastic, in order to hide the electrical components and provide an attractive appearance. It is also preferred that the box structure be provided with mounting hardware for hanging the portrait on a wall. The face 25 portion of each figure bust may be decorated to provide a realistic effect. Conventional artist supplies are suitable for decorating the figure busts. Three dimensional customization may be accomplished with material such as Claycrete Instant Papier Mache, from American Art Clay Co., Inc., of Indianapolis, Ind. Acrylic or other paints can then be used to match the skin, hair, eye and lip colors. Hair may be attached with glue or other adhesive to augment the realistic look of the face 25. It is intended that the figure busts may be formed and decorated to resemble specific individuals.

The system is intended to mimic a dialogue among two or more figure busts, which may be disposed within the same portrait or may be disposed within separate portraits displaced some distance from each other. The communications channel 18 is provided for transferring data among the displaced portraits. The preferred communications channel 18 uses Power Line Carrier transmission, specifically the industry standard X-10 Home Automation System code format. The system includes a communications transceiver 145 for passing data over a home's electric power wiring. A suitable communications transceiver 145 is the TW523 from X-10 (USA) Inc. in Closter N.J. The communications transceiver 145 connects to a standard 117 Volt AC power line, using a conventional wall plug and provides a serial RS-232 communications port. Serial data transmitted to the communications transceiver 145 is encoded and superimposed onto the house power wiring. Carrier signals detected on the home power wiring are decoded and output from the communications transceiver 145, as serial data. The master figure bust 10, each of the slave figure busts 15 and the scripting platform 5 are provided with a communications transceiver 145. It should be noted that a suitable communications channel 18 may be provided by other known means, including Bluetooth™, wireless LAN, such as the 802.11 varieties, WiFi, Ultra Wide Band, Zigbee™, other radio frequency communications devices, wired LAN's and wired serial links. The figure busts are energized by a conventional power supply transformer intended to be connected to standard house power.

Figure 6:
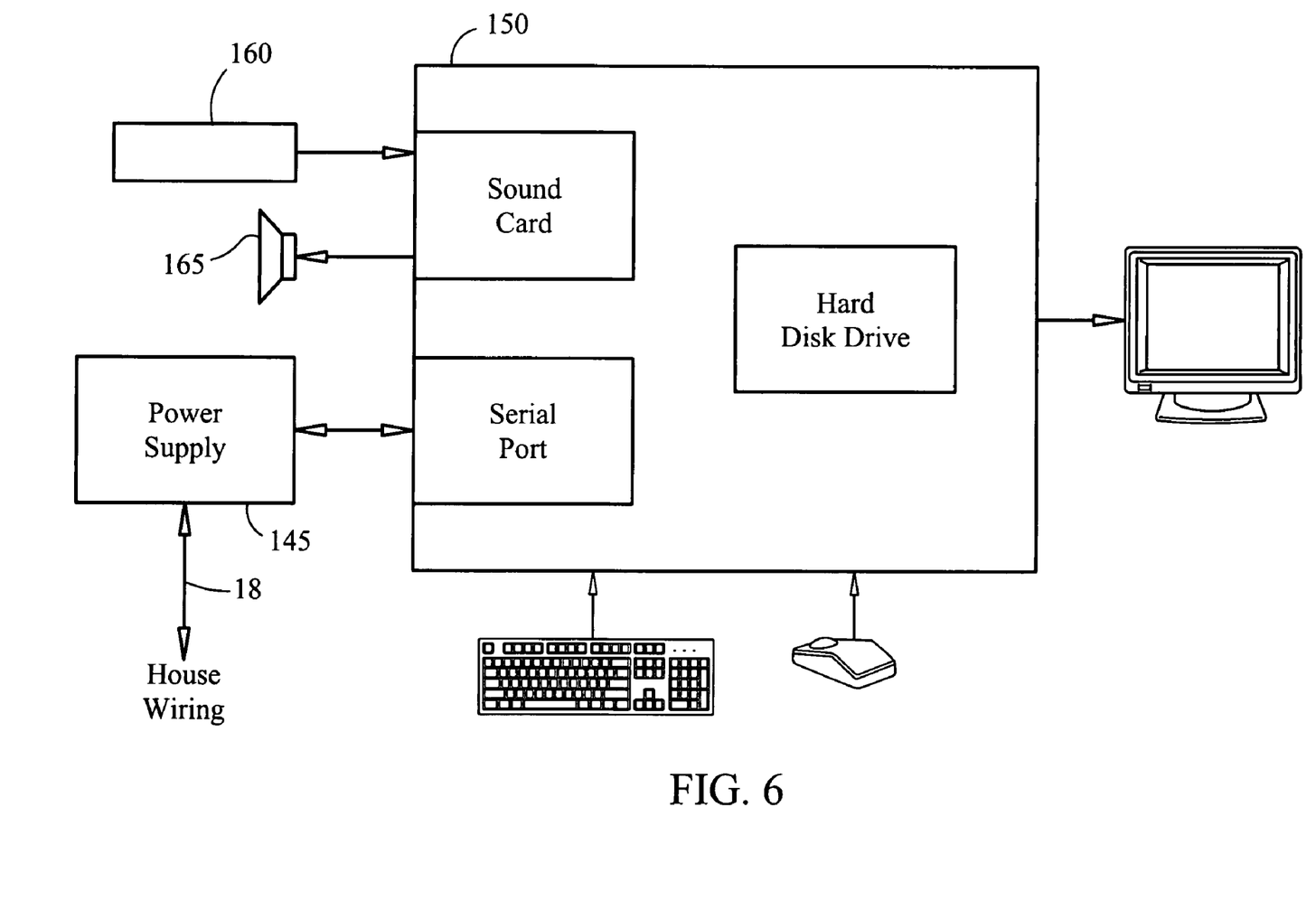
FIG. 6 is a block diagram of the scripting platform showing the link with the communication channel.
Figure 7:
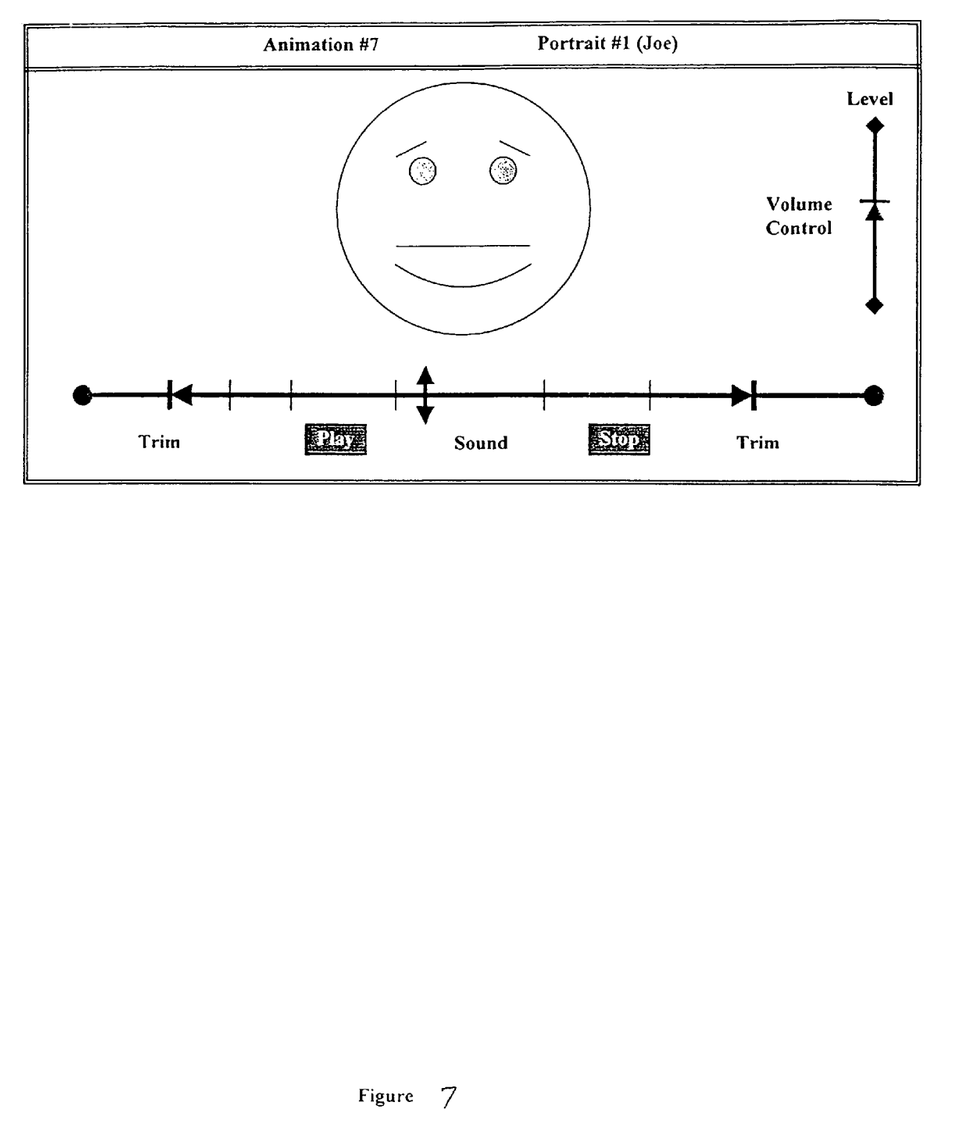
FIG. 7 is a representation of the monitor screen, of the scripting platform, depicting the data processing tools for editing an animation.
Figure 8:
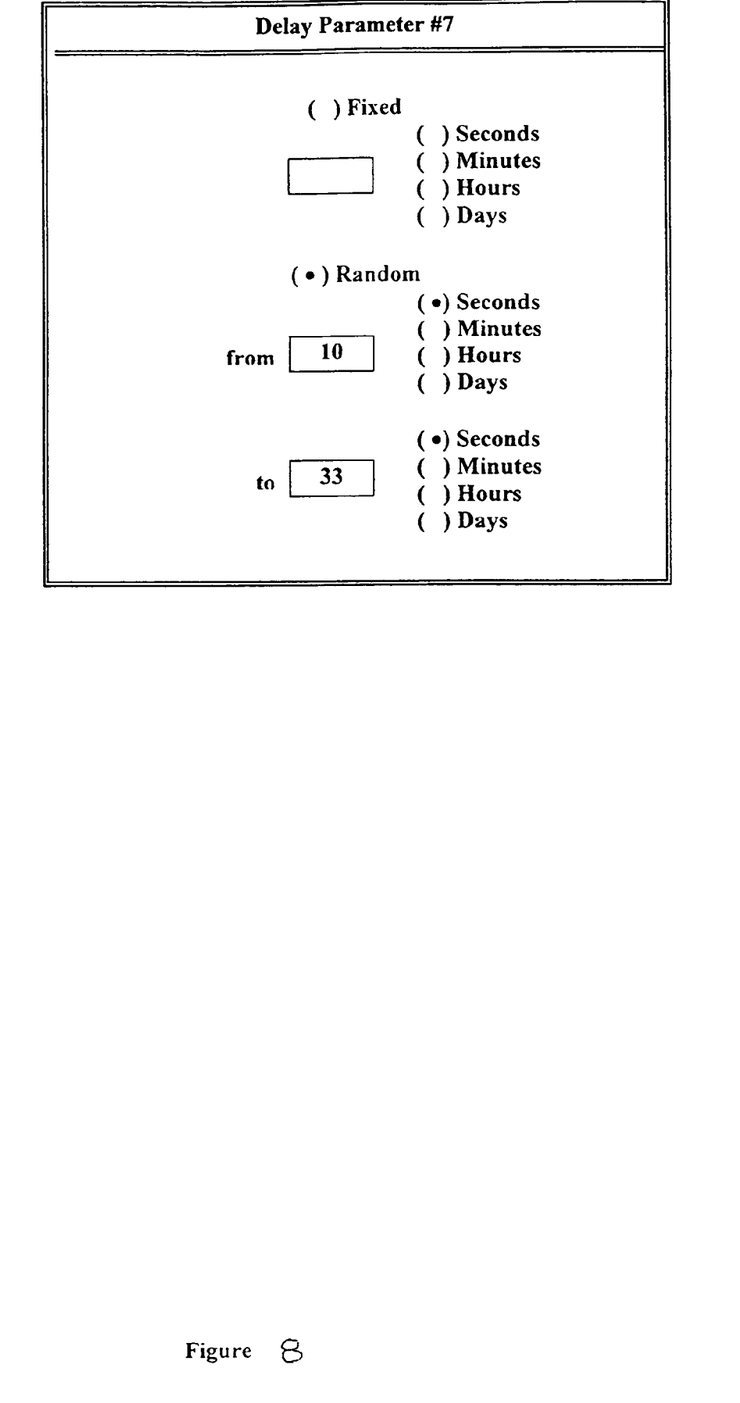
FIG. 8 is a representation of the monitor screen, of the scripting platform, depicting the data processing tools for formulating the delay parameter of an instruction set.

The scripting platform 5, as shown in FIG. 6, comprises a second data processing means, preferably a personal computer 150 connected to a communications transceiver 145, preferably by wire connected to a serial port of the personal computer 150. The personal computer 150 is provided with a standard sound card, a computer microphone 160, and a computer speaker 165. The personal computer 150 is programmed and configured to prepare, label, address, and store animations comprising audio data and sets of instructions. Each animated figure bust is identified with a unique corresponding address. The application software is written in a conventional manner to prompt a user to record audio data consisting of voice sounds. It is intended that different individuals would record a series of audio data segments for each of the animated figure busts so as to provide a separate and unique voice for each of the figure busts. Application software, written in a conventional manner, is provided to edit the audio recording. After a raw recording is made, the software is configured to receive input from a conventional input device, such as a mouse, to allow editing of the recording. As shown in FIG. 7, an audio edit screen is used to trim the start and end of the recording and to adjust the output level. A representative editing screen is shown in FIG. 7. Using a mouse, the user slides the trim bars to clip the start and ending of the recording for use. A slider on the volume control adjusts the sound amplitude level. Each recording is addressed to one of the animated figure busts, and application software, written in a conventional manner, is used to receive input through the mouse to enter facial expressions for the duration of the recording. In order to define the facial expressions, a timeline is shown of the recording's duration, as depicted in FIG. 7. A graphical simulation of the face is depicted on the video screen, and the user clicks on the various facial features, such as the eyelids 35, the eyebrows 30, the eyeballs 40, nose 45 and the upper lip 50 and lower lip 55, until the desired position for each facial feature is displayed on screen. FIG. 7 shows only some of the facial features for clarity. Application software, written in a conventional manner, is provided to translate the positions of facial features, as depicted on the edit screen, into sets of instructions readable by the microcontroller 100, in the figure bust to which the particular animation is addressed, into signals to be output to the various servos to move the facial features to a position within the range of motion which roughly duplicates the position of the corresponding facial feature as depicted on the edit screen, to produce the facial expression as shown. This expression remains in effect until a different position for any facial feature is selected at a later point in the timeline. Vertical bars through the timeline in FIG. 7, show where the facial expressions are changed. Clicking on a timeline bar displays the facial expression previously entered for that time. New facial expressions are selected by clicking anywhere on the timeline and changing the positions of the facial features. An alternate version of the present invention may include a selectable instruction for continuous movement of the lips for a duration spanning selected points on the timeline. The user may play back the recording through the computer speaker 165 by clicking the "play" icon and view the motion of the facial features as a video simulation. The vertical double arrow depiction on the timeline in the FIG. 7 shows time progression through the recording. After interactively viewing and hearing the animation and modifying the facial expressions and sound, the sequence of facial expressions along with the audio recording is stored on the hard drive as an animation, which is marked so as to be labeled for identification and addressed to a particular figure bust. It is preferred that the software also prompt the user to select a delay parameter to be associated with each animation. The personal computer 150 is programmed and configured to display a screen, as shown in FIG. 8. The user may enter information and make selections using an input device, such as a mouse and a keyboard, to add a delay parameter to the animation. The delay time may be for a fixed amount of time or randomly selected amount of time to be determined each time the animation is performed. The delay parameter may be stored on the hard drive as part of the animation such that the performance of the animation will be preceded by a time delay, as programmed, to produce a more realistic effect.

Figure 9:
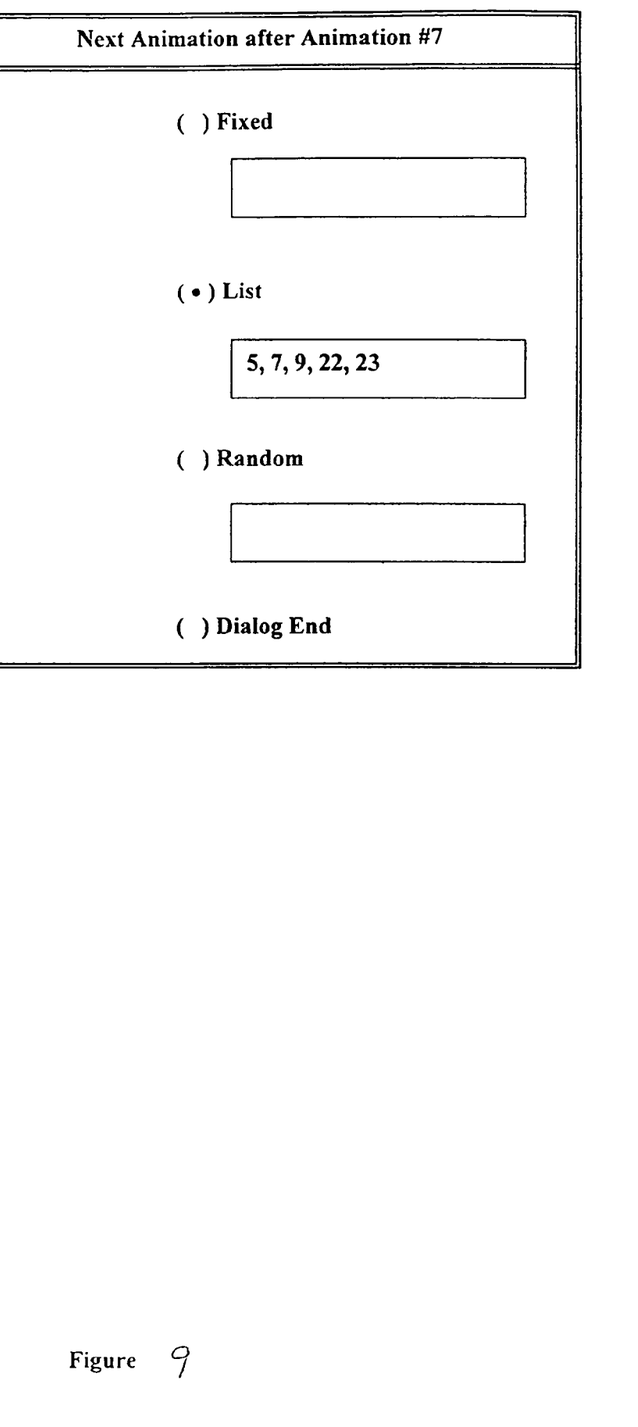
FIG. 9 is a representation of the monitor screen, of the scripting platform, depicting the data processing tools for formulating the next animation pointer parameter of an instruction set.
Figure 10:
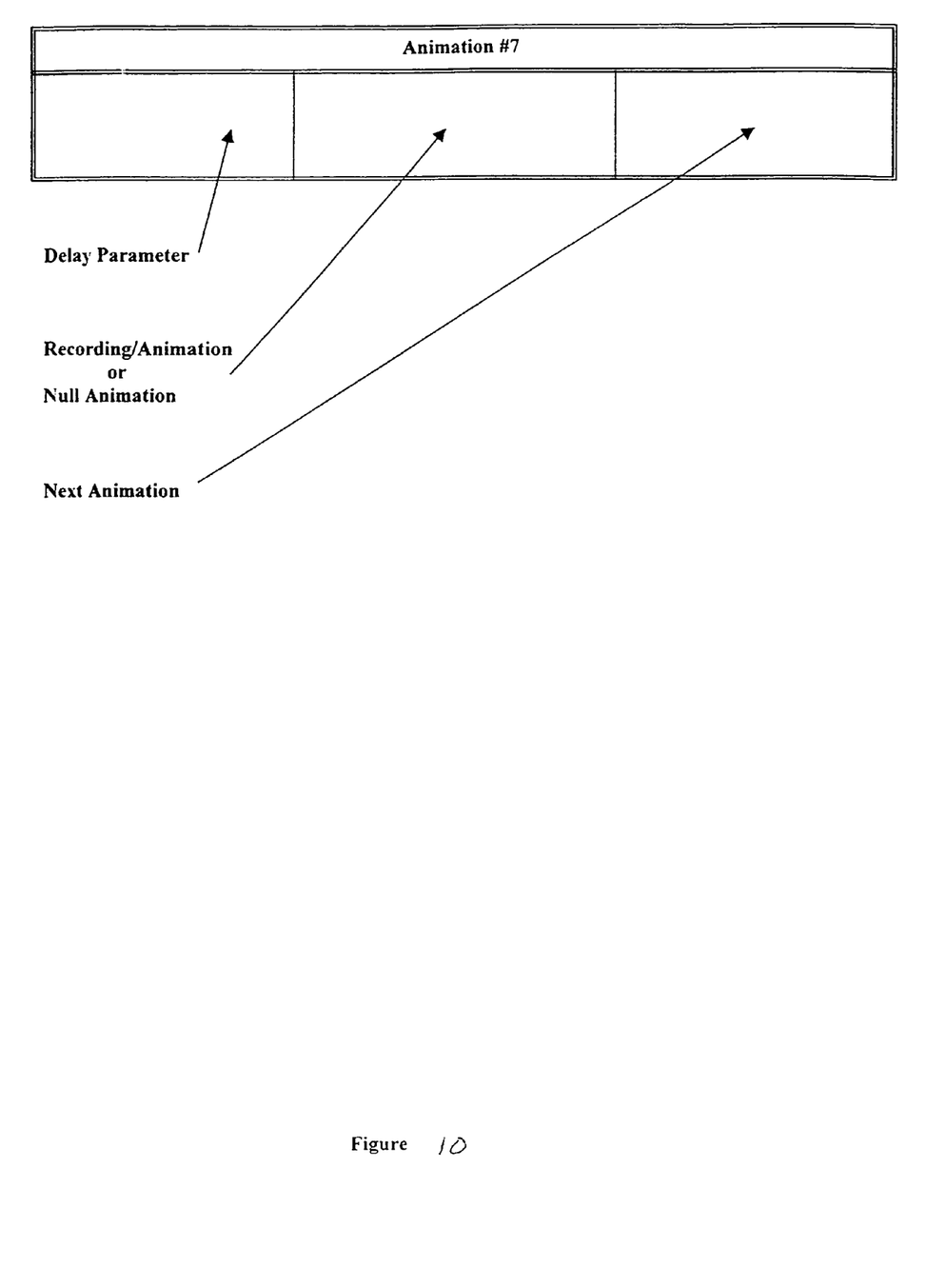
FIG. 10 is a representation of the monitor screen, of the scripting platform, depicting the data processing tools for selecting a component of an animation, for editing.

The personal computer 150 is programmed and configured to add a next animation pointer to each of the stored animations. The software is configured to display a screen as shown in FIG. 9, so that the user may select and enter the parameter for instructing the system to perform a next animation. As shown in FIG. 9, the user may enter the number of a particular animation to follow next. The user may specify a list of animations to be sequenced in order or specify a list of animations to be sequenced at random. In addition a particular animation may be marked as a last animation intended to form the end of a dialogue sequence by marking the particular animation as a "dialogue end", as shown in FIG. 9. The microcontroller 100 of each figure bust is programmed and configured to perform the animations, as prompted by command signal, one after another according to the sequence determined by the next animation pointer of each animation performed in a sequence. It is preferred that the system provide for the entry of a null recording, lasting zero seconds, which may be used to smoothly progress from one animation to another, as the animations are being performed, by the system. Each stored animation consists of parts, as shown in FIG. 10. The parts comprise a delay parameter, the recorded animation consisting of sound and a set of instructions for facial expression, or a null recording and a next animation pointer. Each animation is stored with an identifying number and an address identifying a particular figure bust.

A dialogue consists of a sequence of animations determined by the next animation pointer of each animation in the sequence. The sequence may complete with a dialogue end marker, in one of the animations in the sequence or it may be constructed as a continuous loop. It should be appreciated that a dialogue sequence, which contains at least one animation having a random selection as its next animation marker, may proceed through different animations each time the sequence is performed.

Figure 11:
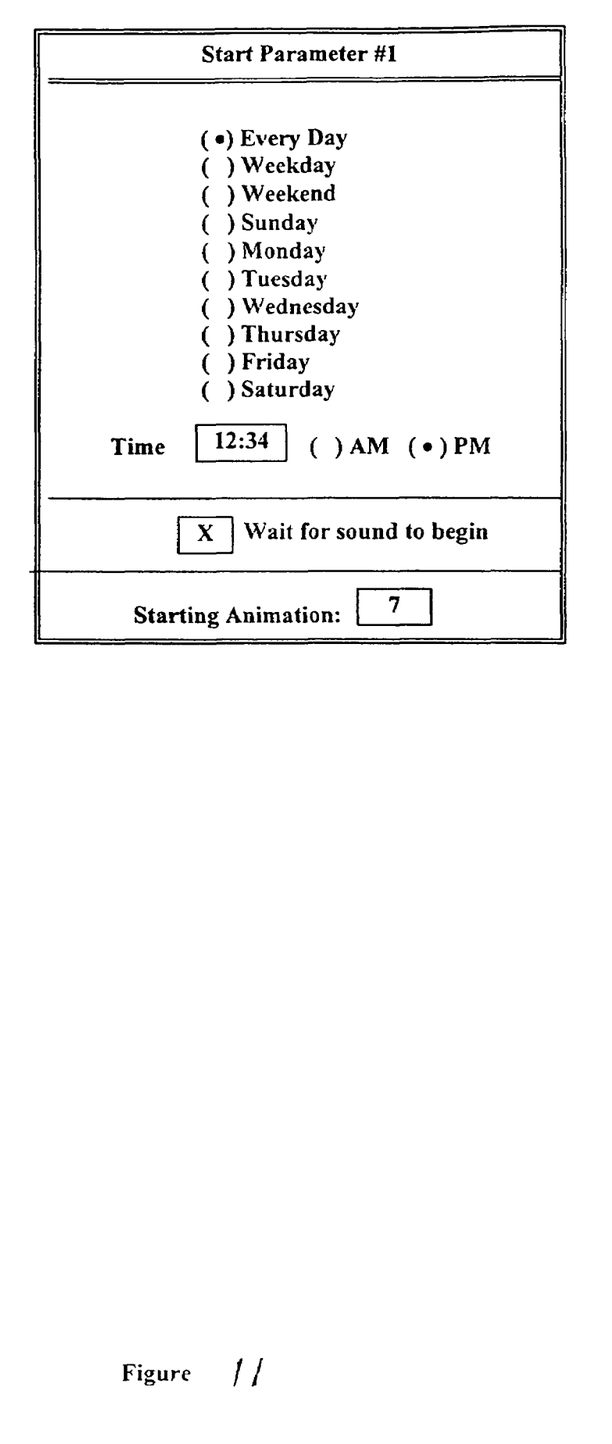
FIG. 11 is a representation of the monitor screen, of the scripting platform, depicting the data processing tools for selecting the initiation event, of an instruction set.

The personal computer 150 is programmed and configured to prompt the user to select and enter one or more start parameters. The system displays a screen as shown in FIG. 11, on which the user selects an event to commence a dialogue sequence. Start times are used to initiate dialogues. Each start time specifies a time-of-day and optionally a day-of-week. An alternate version of the present invention may include a "wait for sound to begin" option. In this version, the system is programmed to recognize a start event, after the start time is reached and only when a sound is detected through the microphone 135 as shown in FIG. 5. It is intended that means, such as a checkbox would be provided, on the monitor screen, for a user to select sound activation. The user may enter a starting animation, as illustrated in FIG. 11. It is intended that a plurality of start parameters may be entered and stored on the hard drive. The personal computer 150 is programmed and configured to assemble starting and next animation pointer parameters and animation duration data and to download parameters and data to the master figure bust 10, and to download animations to the slave figure busts 15 and to the master figure bust 10. It is intended that each of the animations will be downloaded to a particular one of the figure busts according to the address. In addition to animations addressed to the master figure bust 10, the master figure bust 10 will also receive and store data comprising parameters, next animation pointers, animation duration data and an animation list with addresses, for orchestrating performance of animations in scripted dialogue sequence. The animations may be deleted and new or edited animations may be downloaded periodically, as the user desires. The download is completed through the communications channel 18. During download, any dialogue sequences currently being performed are terminated and animations and parameters are replaced with new data. It is intended that each animation would be stored in the flash memory 105 of the figure bust to which it is addressed, according to a command signal issued by the personal computer 150. After recording, editing and downloading are complete, the personal computer 150 may be turned off.

The command firmware, on the microcontroller 100 of the master figure bust 10 is programmed and configured to monitor the real time clock 125 and microphone 135 to determine the start event, as defined on the starting parameters stored in the flash memory 105, of the master figure bust 10. When a match occurs, the microcontroller 100 of the master figure bust 10 retrieves and reads the appropriate start parameter to determine the starting animation. The microcontroller 100 of the master figure bust 10 issues a command signal to the appropriate figure bust, through the communications channel 18 to perform the starting animation or performs an animation addressed to the master figure bust 10. The microcontroller 100 of the selected figure bust, operates to perform the starting animation. The microcontroller 100 of the master figure bust 10 counts the run time of the starting animation according to the animation duration data, and reads the next animation pointer of the starting animation. The microcontroller 100 of the master figure bust 10 signals the appropriate figure bust to commence the subsequent animation, as determined by the next animation pointer of the starting animation and the sequence continues with each animation being performed by the figure bust as addressed. The command firmware of the master figure bust 10 continues orchestrating the dialogue until the end marker of the dialogue sequence is reached. At that point, the microcontroller 100 of the master figure bust 10 resumes monitoring to determine a match for the next starting parameter. The switch 130, may be operated to alternately stop and start the system. The microcontroller 100 of the master figure bust 10 is programmed and configured to transmit the stop and start command to all slave figure busts 15 through the communications channel 18. In an alternate version, the system may include a pause function to enable the user to pause and continue the operation of the system during the performance of an animation or dialogue sequence and the system may include separate volume controls for each of the figure busts.

An example of the orchestrating sequence is as follows:
startng animation #1: next animation pointer=list of #2, #3, #4
animation #2: next animation pointer=#5
animation #3: next animation pointer=#6
animation #4: next animation pointer=#7
animation #5: next animation pointer=#1
animation #6: next animation pointer=#1
animation #7: next animation pointer=dialogue end
then the animations would be performed in the following order:
1,2,5,1,3,6,1,4,7, finished The microcontroller 100 of the master figure bust times the duration of the starting animation and reads the next animation pointer, of the starting animation to determine the next animation. Each time animation number one is performed, the subsequent animation in the next animation pointer list is selected by the firmware of the master figure bust 10. If the end of the list is reached, the cycle returns to the beginning of the list.

Having fully described the present invention, it may be understood that minor variations may be introduced without departing from the spirit and scope of the invention as disclosed and claimed herein.

The invention claimed is:

1. A system of one or more electronic portraits for presenting preprogrammed animations including facial expression and voice, comprising:
   one or more artificially animated figure busts, disposed on said portraits, a communications channel, and a scripting platform;
   each of said artificially animated figure busts having a three dimensional replica of a face;
   each of said replicas of a face having one or more moveable facial features;
   each of said artificially animated figure busts having mechanical means for moving said facial features and motive means for actuating said mechanical means;
   said motive means being operably connected to said mechanical means and said mechanical means being operably connected to said facial features;
   each of said artificially animated figure busts having sound reproducing means;
   each of said artificially animated figure busts having first data processing means for receiving and processing command signals, to receive, store, retrieve, and perform said preprogrammed animations;

said first data processing means having a plurality of output channels operably connected to said motive means and said sound reproducing means;

each of said artificially animated figure busts having means for energizing said motive means, said sound reproducing means and said first data processing means;

said scripting platform having second data processing means;

said second data processing means having means for preparing, editing, and storing, said preprogrammed animations;

said second data processing means having means for marking said stored animations with a unique label for each of said animations and with a unique address for each of said figure busts;

said second data processing means having means for preparing and storing parameters, next animation pointers, animation duration data, and animation lists with addresses, for orchestrating performance of said preprogrammed animations;

said scripting platform being electronically linked to each of said artificially animated figure busts by said communications channel;

a one of said figure busts having a command package;

said command package being electronically linked to each of said artificially animated figure busts;

said second data processing means having means for delivering said parameters, next animation pointers, animation duration data, and animation lists with addresses to said one of said figure busts, and means for delivering said marked animations to said figure busts, by said communications channel;

said command package having means for determining an initiation event and for issuing one or more of said command signals to said figure busts for retrieving and performing said animations.

2. The system of one or more electronic portraits of claim 1, wherein:

said first data processing means comprises a microcontroller and a flash memory;

said microcontroller being provided with firmware and being programmed and configured for receiving data comprising executable sets of instructions and recorded material, through said communications channel, storing data on said flash memory, and executing said instructions;

said plurality of output channels being pulse width modulation output channels for energizing said motive means;

said microcontroller having a digital to analog converter for outputting sound to said sound reproducing means.

3. The system of one or more electronic portraits of claim 2 wherein:

each of said plurality of pulse width modulation output channels is connected to said motive means and configured to selectively position a one of said facial features according to said sets of instructions;

said sets of instructions being designed to synchronize the operation of said plurality of pulse width modulation output channels for animation of said facial features.

4. The system of one or more electronic portraits of claim 1, wherein:

said command package includes a real time clock, a switch, a microphone, and command firmware, programmed on said microcontroller of said one of said figure busts;

said clock, said switch, and said microphone are electrically connected to said microcontroller of said one of said figure busts;

said command firmware is programmed and configured to receive and respond to signals input from said clock, said switch and said microphone.

5. The system of one or more electronic portraits of claim 4, wherein said means for determining an initiation event include monitoring said real time clock and said microphone to detect a match to a start parameter.

6. The system of one or more electronic portraits of claim 4, wherein said command firmware includes one or more pseudorandom number generator routines operable for randomly selecting said preprogrammed animations and parameters.

7. The system of one or more electronic portraits of claim 1, wherein:

said second data processing means comprises a personal computer having a standard sound card, a computer microphone and a computer speaker;

said means for preparing, editing, and storing said preprogrammed animations includes means for recording and editing voice sounds, means for defining and editing a sequence of facial expressions, means for synchronizing, labeling, addressing and storing said voice sounds and sequence of facial expressions as audio data and sets of instructions forming said preprogrammed animations;

said means for preparing and storing parameters, next animation pointers, animation duration data and animation lists includes:

means for selecting a delay parameter as a part of a one of said preprogrammed animations, means for selecting a next animation pointer as a part of a one of said preprogrammed animations, means for storing each of said preprogrammed animations with an identifying number and an address identifying a particular one of said figure busts, and means for selecting a start parameter, an end parameter, and a dialog sequence comprising a plurality of said preprogrammed animations; and said means for delivering said marked animations to said figure busts includes:

means for downloading said marked animations to each of said figure busts according to said addresses said means for delivering said parameters next animation pointers, animation duration data, and animation lists with addresses to said one of said figure busts includes means for downloading said next animation pointers, animation duration data, and animation lists with addresses to said one of said figure busts.

8. A system of one or more electronic portraits for presenting preprogrammed animations including facial expression and voice, comprising:

one or more artificially animated figure busts, disposed on said portraits, a communications channel, and a scripting platform;

each of said artificially animated figure busts having a three dimensional replica of a face;

each of said replicas of a face having one or more moveable facial features;

each of said artificially animated figure busts having mechanical means for moving said facial features and motive means for actuating said mechanical means;

said motive means being operably connected to said mechanical means and said mechanical means being operably connected to said facial features;

each of said artificially animated figure busts having sound reproducing means;

each of said artificially animated figure busts having first data processing means for receiving and processing command signals, to receive, store, retrieve, and perform said preprogrammed animations;

said first data processing means having a plurality of output channels operably connected to said motive means and to said sound reproducing means;

each of said artificially animated figure busts having means for energizing said motive means, said sound reproducing means and said first data processing means;

said scripting platform having second data processing means;

said second data processing means having means for preparing, editing, and storing, said preprogrammed animations;

said second data processing means having means for marking said stored animations with a unique label for each of said animations and with a unique address for each of said figure busts;

said second data processing means having means for preparing and storing parameters, next animation pointers, animation duration data, and animation lists with addresses, for orchestrating performance of said preprogrammed animations;

said scripting platform being electronically linked to each of said artificially animated figure busts by said communications channel;

said system having a command package;

said command package having a command microcontroller and being electronically linked to each of said artificially animated figure busts;

said second data processing means having means for delivering said parameters, next animation pointers, animation duration data, and animation lists with addresses to said command package, and means for delivering said marked animations to said figure busts, by said communications channel;

said command package having means for determining an initiation event and for issuing one or more of said command signals to said figure busts for retrieving and performing said animations.

9. The system of one or more electronic portraits of claim 8, wherein:

said first data processing means comprises a microcontroller and a flash memory;

said microcontroller being provided with firmware and being programmed and configured for receiving data comprising executable sets of instructions and recorded material, through said communications channel, storing data on said flash memory, and executing said instructions;

said microcontroller having a plurality of pulse width modulation output channels for energizing said motive means;

said microcontroller having a digital to analog converter for outputting sound to said sound reproducing means.

10. The system of one or more electronic portraits of claim 9 wherein:

each of said plurality of pulse width modulation output channels is connected to said motive means and configured to selectively position a one of said facial features according to said sets of instructions;

said sets of instructions being designed to synchronize the operation of said plurality of pulse width modulation output channels for animation of said facial features.

11. The system of one or more electronic portraits of claim 8, wherein:

said command package includes a real time clock, a switch, a microphone, and command firmware, programmed on said command microcontroller;

said clock, said switch, and said microphone are electrically connected to said command microcontroller;

said command firmware is programmed and configured to receive and respond to signals input from said clock, said switch and said microphone.

12. The system of one or more electronic portraits of claim 8, wherein said means for determining an initiation event include monitoring said real time clock and said microphone to detect a match to a start parameter.

13. The system of one or more electronic portraits of claim 11, wherein said command firmware includes one or more pseudorandom number generator routines operable for randomly selecting said preprogrammed animations and parameters.

14. The system of one or more electronic portraits of claim 8, wherein:

said second data processing means comprises a personal computer having a standard sound card, a computer microphone and a computer speaker;

said means for preparing, editing, and storing said preprogrammed animations includes means for recording and editing voice sounds, means for defining and editing a sequence of facial expressions, means for synchronizing, labeling, addressing and storing said voice sounds and sequence of facial expressions as audio data and sets of instructions forming said preprogrammed animations;

said means for preparing and storing parameters, next animation pointers, animation duration data and animation lists includes:

means for selecting a delay parameter as a part of a one of said preprogrammed animations, means for selecting a next animation pointer as a part of a one of said preprogrammed animations, means for storing each of said preprogrammed animations with an identifying number and an address identifying a particular one of said figure busts, and means for selecting a start parameter, an end parameter, and a dialog sequence comprising a plurality of said preprogrammed animations; and said means for delivering said marked animations to said figure busts includes:

means for downloading said marked animations to each of said figure busts according to said addresses said means for delivering said parameters next animation pointers, animation duration data, and animation lists with addresses to said one of said figure busts includes means for downloading said next animation pointers, animation duration data, and animation lists with addresses to said command microcontroller.

* * * * *